(12) United States Patent
Jeong et al.

(10) Patent No.: US 11,758,267 B2
(45) Date of Patent: Sep. 12, 2023

(54) DEVICE AND METHOD FOR CONTROLLING IMAGE OF VEHICLE

(71) Applicants: Hyundai Motor Company, Seoul (KR); Kia Corporation, Seoul (KR); Yura Corporation Co., Ltd., Seongnam (KR); Hyundai Mobis Co., Ltd., Seoul (KR)

(72) Inventors: Dong Hyuk Jeong, Hwaseong (KR); Moon Hyun Seo, Hwaseong (KR); Gyun Ha Kim, Incheon (KR); Woo Sung Lee, Yongin (KR); Tae Ryong Kang, Yongin (KR)

(73) Assignees: Hyundai Motor Company, Seoul (KR); Kia Corporation, Seoul (KR); Yura Corporation Co., Ltd., Seongnam (KR); Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 17/742,259

(22) Filed: May 11, 2022

(65) Prior Publication Data

US 2023/0026986 A1 Jan. 26, 2023

(30) Foreign Application Priority Data

Jul. 22, 2021 (KR) .......... 10-2021-0096660

(51) Int. Cl.
*H04N 23/66* (2023.01)
*B60W 10/00* (2006.01)
*B60R 11/04* (2006.01)
*H04N 23/90* (2023.01)

(52) U.S. Cl.
CPC ............. *H04N 23/66* (2023.01); *B60R 11/04* (2013.01); *B60W 10/00* (2013.01); *H04N 23/90* (2023.01); *B60W 2420/42* (2013.01)

(58) Field of Classification Search
CPC ......... H04N 23/66; B60R 11/04; B60W 10/00; H04N 23/90; B60W 2420/42; H04N 23/60; B60W 40/02; B60R 16/023; B60W 30/182; B60W 50/14; H04N 7/181; H04N 23/661; H04N 23/667; B60W 2050/0057; B60W 2556/45
See application file for complete search history.

(56) References Cited

U.S. PATENT DOCUMENTS 10,861,338 B2 12/2020 Nix
2002/0047910 A1* 4/2002 Tariki .................... H04N 23/66
348/E.7086

(Continued)

FOREIGN PATENT DOCUMENTS

JP 2021-013175 A 2/2021
KR 10-2015-0005012 A 1/2015
(Continued)

*Primary Examiner* — Hung H Lam
(74) *Attorney, Agent, or Firm* — Fox Rothschild LLP

(57) ABSTRACT

A device and a method are provided for controlling an image of a vehicle for an image of a vehicle camera that does not have a built-in image signal processor (ISP). A communication device receives information on an operation mode of the vehicle from a vehicle system and a camera device that does not have a built-in ISP obtains an image of a surrounding region of the vehicle, and transmits the image of the surrounding region to a first image controller. The first image controller having a first ISP for performing image processing shares the image of the surrounding region with a second image controller having a second ISP for performing image processing. The first image controller and the second image controller alternatively have a control right for the camera device depending on the operation mode of the vehicle.

20 Claims, 9 Drawing Sheets

(56) References Cited

U.S. PATENT DOCUMENTS

| | | | |
|---|---|---|---|
| 2014/0181035 A1* | 6/2014 | Moue et al. | G06F 16/2255 |
| | | | 707/647 |
| 2017/0237937 A1* | 8/2017 | Motohashi et al. | H04N 23/90 |
| | | | 348/148 |
| 2020/0125858 A1 | 4/2020 | Bauer et al. | |
| 2022/0176908 A1* | 6/2022 | Suenaga | B60R 25/403 |
| 2022/0375374 A1* | 11/2022 | Nicholson et al. | H04N 7/183 |
| 2022/0408061 A1* | 12/2022 | Jeong et al. | H04N 23/65 |

FOREIGN PATENT DOCUMENTS

| | | | |
|---|---|---|---|
| KR | 10-2018-0002251 A | 1/2018 |
| KR | 10-2019-0066396 A | 6/2019 |
| KR | 10-2020-0049643 A | 5/2020 |

\* cited by examiner

DEVICE AND METHOD FOR CONTROLLING IMAGE OF VEHICLE

CROSS-REFERENCE TO RELATED APPLICATION

This application claims the benefit of priority to Korean Patent Application No. 10-2021-0096660, filed on Jul. 22, 2021, the entire contents of which are incorporated herein by reference.

TECHNICAL FIELD

The present disclosure relates to a device and a method for controlling an image of a vehicle, and more particularly, to a device and a method for controlling an image of a vehicle camera in which an image signal processor (ISP) is not built-in.

BACKGROUND

By obtaining an image of a surrounding region through a camera of a vehicle, a built-in cam system may obtain images of region in front of and at the rear of the vehicle based on a condition, and may perform function setting and stored image identification in association with an AVN (Audio, Video, Navigation) of the vehicle. Even during parking while another control device of the vehicle is turned off or in sleep, a control device of the built-in cam system may be directly connected to a rear camera used in common to record an image. In particular, the image filmed through the rear camera may be shared with a control device of at least one of the built-in cam, a surround view monitor (SVM), an advanced driver assistance system-parking (ADAS-PRK), and/or the like, and the control devices of the built-in cam, the SVM, and the ADAS-PRK control device may be connected to the rear camera through a coaxial cable.

It is necessary to develop a control technology to not cause problems in a process of applying such SVM control device and built-in cam control device to the vehicle as independent options, and to solve a matching problem between ISPs of the built-in cam and the SVM and image sensor of the camera when the built-in CAM and the SVM are applied at the same time.

SUMMARY

The present disclosure has been made to solve the above-mentioned problems occurring in the prior art while advantages achieved by the prior art are maintained intact. An aspect of the present disclosure provides a device and a method for controlling an image of a vehicle for an image of a vehicle camera that does not have a built-in image signal processor (ISP).

Another aspect of the present disclosure provides a device and a method for controlling an image of a vehicle that allow a technology for transferring an ISP, which was built in a camera, to a control device to operate appropriately based on each vehicle operation mode. Another aspect of the present disclosure provides a device and a method for controlling an image of a vehicle that do not allow inoperability or image quality degradation to occur by setting an operation priority for controlling a camera that does not have a built-in ISP.

Another aspect of the present disclosure provides a device and a method for controlling an image of a vehicle that minimize consumption of current for a plurality of control devices that control images of a camera that does not have a built-in ISP. Another aspect of the present disclosure provides a device and a method for controlling an image of a vehicle that support a fail-safe function during abnormal operation of a camera that does not have a built-in ISP.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling an image of a vehicle may include a communication device disposed in the vehicle for receiving information on an operation mode of the vehicle from a vehicle system, a camera device disposed in the vehicle, and not having a built-in image signal processor (ISP), wherein the camera device is configured to obtain an image of a surrounding region of the vehicle, and transmit the image of the surrounding region to a first image controller, the first image controller having a first ISP for performing image processing, wherein the first image controller is configured to share the image of the surrounding region with a second image controller, and the second image controller having a second ISP for performing image processing, and the first image controller and the second image controller alternatively have a control right for the camera device based on the operation mode of the vehicle.

In one implementation, the first image controller may be configured to perform image processing for the image of the surrounding region through the first ISP, and store the image-processed image of the surrounding region in a nonvolatile memory. In one implementation, the second image controller may be configured to perform image processing for the image of the surrounding region through the second ISP, and output the image-processed image of the surrounding region in real time.

In one implementation, the camera device may include a camera configured to obtain an image of a region at the rear of the vehicle. The first image controller and the second image controller may be configured to share an image sensor parameter of the camera device with each other. The operation mode of the vehicle may include a traveling mode, a mode of outputting the image of the surrounding region of the vehicle in real time during parking, and a mode of not outputting the image of the surrounding region of the vehicle in real time during the parking.

In addition, the first image controller may include a deserializer (DES) configured to convert the image of the surrounding region transmitted from the camera device into an internal signal, and a serializer (SER) configured to convert the internal signal into an image signal for external transmission, and the first image controller may be configured to initialize the DES and the SER when the vehicle is traveling or when the vehicle outputs the image of the surrounding region in real time during parking.

The first image controller may have the control right for the camera device until the initialization of the DES and the SER is completed. The second image controller may have the control right for the camera device when the vehicle is traveling or when the vehicle outputs the image of the surrounding region in real time during parking. In addition, the second image controller may be turned off when the vehicle does not output the image of the surrounding region in real time during parking.

The first image controller may have the control right for the camera device when the vehicle does not output the image of the surrounding region in real time during parking. The second image controller may be configured to request the first image controller to reset the camera device in response to determining that an abnormality has occurred in the camera device when the vehicle is traveling or when the vehicle outputs the image of the surrounding region in real time during parking. In addition, the first image controller may be configured to transmit a high signal or a low signal to the second image controller through at least one of a hard wire and/or a controller area network (CAN) to transmit information on the control right for the camera device. The second image controller may be configured to request the reset of the camera device by transmitting a high signal or a low signal to the first image controller through a hard wire or transmitting a reset request signal to the first image controller via a CAN communication.

According to another aspect of the present disclosure, a method for controlling an image of a vehicle may include receiving, by a communication device disposed in the vehicle, information on an operation mode of the vehicle from a vehicle system, obtaining, by a camera device disposed in the vehicle, and not having a built-in ISP, an image of a surrounding region of the vehicle, transmitting, by the camera device, the image of the surrounding region to a first image controller, sharing, by the first image controller having a first ISP for performing image processing, the image of the surrounding region with a second image controller having a second ISP for performing image processing, and alternatively having, by the first image controller and the second image controller, a control right for the camera device depending on the operation mode of the vehicle.

In one implementation, the method may further include sharing, by the first image controller and the second image controller, an image sensor parameter of the camera device with each other. The method may further include initializing, by the first image controller, a deserializer (DES) configured to convert the image of the surrounding region transmitted from the camera device into an internal signal, and a serializer (SER) configured to convert the internal signal into an image signal for external transmission when the vehicle is traveling or when the vehicle outputs the image of the surrounding region in real time during parking, and the alternatively having, by the first image controller and the second image controller, of the control right for the camera device may include having, by the first image controller, the control right for the camera device until the initialization of the DES and the SER is completed.

The alternatively having, by the first image controller and the second image controller, of the control right for the camera device may include having, by the second image controller, the control right for the camera device when the vehicle is traveling or when the vehicle outputs the image of the surrounding region in real time during parking. Additionally, the method may further include turning off the second image controller when the vehicle does not output the image of the surrounding region in real time during parking, and the alternatively having, by the first image controller and the second image controller, of the control right for the camera device may include having, by the first image controller, the control right for the camera device when the vehicle does not output the image of the surrounding region in real time during parking. The method may further include requesting, by the second image controller, the first image controller to reset the camera device in response to determining that an abnormality has occurred in the camera device when the vehicle is traveling or when the vehicle outputs the image of the surrounding region in real time during parking.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
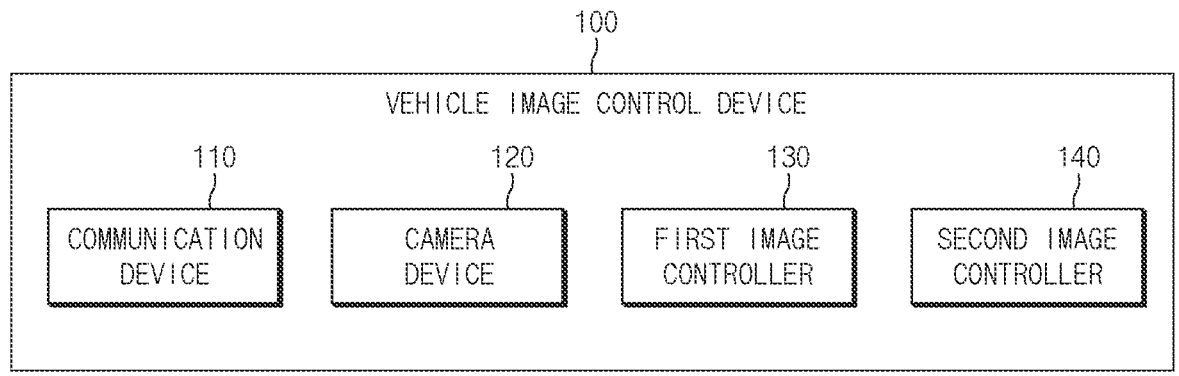
FIG. 1 is a block diagram showing a vehicle image control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to FIGS. 1 to 9. FIG. 1 is a block diagram showing a vehicle image control device according to an embodiment of the present disclosure.

A vehicle image control device 100 according to the present disclosure may be implemented inside or outside a vehicle. In this connection, the vehicle image control device 100 may be integrally formed with internal control units of the vehicle, or may be implemented as a separate hardware device and connected to the controllers or control units of the vehicle by connection means. As an example, the vehicle image control device 100 may be implemented integrally with the vehicle, or may be implemented in a form installed in/attached to the vehicle as a component separate from the vehicle. Alternatively, the vehicle image control device 100 may be implemented in a form in which a portion thereof is implemented integrally with the vehicle, and the remaining portion thereof is installed in/attached to the vehicle as a component separate from the vehicle.

Referring to FIG. 1, the vehicle image control device 100 may include a communication device 110, a camera device 120, a first image controller 130, and a second image controller 140. The communication device 110 may be equipped in the vehicle, and may be configured to receive information on an operation mode of the vehicle from a vehicle system As an example, the communication device 110 may be configured to receive the information on the operation mode of the vehicle from the vehicle system via in-vehicle communication such as controller area network (CAN) communication, local interconnect network (LIN) communication, Flex-Ray, media oriented system transport (MOST), Ethernet, CAN with flexible data rate (CAN-FD), or the like.

As an example, the operation mode of the vehicle may include a traveling mode, a mode of outputting an image of a surrounding region of the vehicle in real time during parking, and a mode of not outputting the image of the surrounding region of the vehicle in real time during the parking. As an example, the mode of outputting the image of the surrounding region of the vehicle in real time during the parking may indicate a mode of outputting the image of the surrounding region of the vehicle in real time during the parking through an AVN (Audio, Video, Navigation) of the vehicle or a communication terminal of the user connected to the vehicle. As an example, the communication device 110 may be connected via wireless or wired communication to the first image controller 130 and the second image controller 140, and may be configured to transmit the information on the operation mode of the vehicle to the first image controller 130 and the second image controller 140.

The camera device 120 may be equipped in the vehicle, may not have a built-in image signal processor (ISP), and may be configured to obtain the image of the surrounding region of the vehicle. As an example, the camera device 120 may be configured to obtain the image even when another control system of the vehicle is turned off or in sleep. The camera device 120 may be configured to transmit the image of the surrounding region to the first image controller 130. As an example, the camera device 120 may include a camera configured to obtain an image of a region at the rear of the vehicle.

The image obtained through the camera device 120 may include an image commonly used in the first image controller 130 and the second image controller 140. The first image controller 130 or the second image controller 140 may alternatively have a control right for the camera device 120 based on the operation mode of the vehicle. As an example, the control right for the camera device 120 may include a control right of internal communication for the camera device 120.

As an example, the first image controller 130 or the second image controller 140 may alternatively control image filming and image transmission of the camera device 120. As an example, the first image controller 130 or the second image controller 140 may be configured to alternatively control an image sensor parameter of the camera device 120. As an example, the first image controller 130 and the second image controller 140 may be connected to each other via a coaxial cable.

As an example, the first image controller 130 and the second image controller 140 may be configured to share the image sensor parameter of the camera device 120 with each other. As an example, the first image controller 130 and the second image controller 140 may be configured to share an image processing-related parameter of the camera device 120 with each other. The first image controller 130 may have a first ISP that performs image processing, and may be configured to share the image of the surrounding region with the second image controller 140. As an example, the first ISP and a second ISP to be described later may perform an image processing function such as auto white balance (AWB), auto exposure (AE), noise removal, and the like. As an example, the first image controller 130 may be configured to supply power to the camera device 120.

The first image controller 130 may be configured to adjust the power supplied to the camera device 120 to perform reset of the camera device 120 to be described later. As an example, the first image controller 130 may be configured to perform image processing for the image of the surrounding region through the first ISP, and store an image-processed image of the surrounding region in a non-volatile memory. As an example, the first image controller 130 may include a control device of a vehicle image recording device built in the vehicle configured to store the image of the surrounding region in the non-volatile memory.

As an example, the first image controller 130 may include a control device of a built-in cam of the vehicle. As an example, the first image controller 130 may include a deserializer (DES) configured to convert the image of the surrounding region transmitted from the camera device into an internal signal, and a serializer (SER) configured to convert the internal signal into an image signal for external transmission. As an example, the DES may include a device configured to convert a low voltage differential signaling (LVDS) camera image signal outside of the first image controller 130 into a signal that is able to be input into the first image controller 130.

As an example, the SER may include a device configured to convert a signal to transmit the camera image signal through the low voltage differential signaling (LVDS) to the outside of the first image controller 130. As an example, when the vehicle is traveling or when the vehicle is outputting the image of the surrounding region in real time during the parking, the first image controller 130 may be configured to initialize the DES and the SER.

It is necessary to initialize the DES and the SER, which are paths through which the LVDS image signal and/or a control signal transmitted from and received to the camera device 120 pass, for the second image controller 140 other than the first image controller 130 to communicate with the camera device 120 and operate the camera device 120. As an example, the first image controller 130 may have the control right for the camera device 120 until the initialization of the DES and the SER is completed.

Since the second image controller 140 is not able to operate the camera device 120 until the initialization of the DES and the SER is completed, the first image controller 130 may have the control right for the camera device 120. As an example, when the vehicle does not output the image of the surrounding region in real time during the parking, the first image controller 130 may have the control right for the camera device 120.

When the vehicle does not output the image of the surrounding region in real time during the parking, the second image controller 140 is not required to output the image of the surrounding region in real time, so that the first image controller 130 may have the control right for the camera device 120. As an example, the first image controller 130 may be configured to share information on whether the first image controller 130 has the control right of the internal communication for the camera device 120 or whether the second image controller 140 has the control right of the internal communication for the camera device 120 with the second image controller 140 to prevent a conflict of control for the internal communication for the camera device 120.

As an example, the first image controller 130 may be configured to transmit the information on the control right for the camera device 120 by transmitting a high signal or a low signal to the second image controller 140 through at least one of a hard wire and/or the controller area network (CAN) communication. Exemplarily, when the first image controller 130 transmits the low signal to the second image controller 140, it may indicate that the first image controller 130 has the control right for the camera device 120. In addition, when the first image controller 130 transmits the high signal to the second image controller 140, it may indicate that the second image controller 140 has the control right for the camera device 120.

According to an embodiment, the low signal may indicate that the second image controller 140 has the control right for the camera device 120, and the high signal may indicate that the first image controller 130 has the control right for the camera device 120. The second image controller 140 may include the second ISP configured to perform the image processing. As an example, the second image controller 140 may be configured to perform the image processing for the image of the surrounding region through the second ISP, and may be configured to output the image-processed image of the surrounding region in real time.

As an example, the second image controller 140 may include a control device of a device configured to output the image of the surrounding region (regions in front of, at the rear of, on a left side, and on a right side of the vehicle) through an output device such as the AVN (Audio, Video, Navigation) and the like of the vehicle to display a surrounding situation of the vehicle in real time. As an example, the second image controller 140 may include a control device of a surround view monitor (SVM) or a control device of an advanced driver assistance system-parking (ADAS-PRK) of the vehicle. As an example, when the vehicle is traveling or when the vehicle is outputting the image of the surrounding region in real time during the parking, the second image controller 140 may have the control right for the camera device 120.

When the second image controller 140 has the control right for the camera device 120, images respectively obtained from a rear camera, a front camera, a left camera, and a right camera may be synthesized through the same ISP and logic, and may prevent a problem of a recognition rate for image quality or color in an image recognition function. As an example, when the vehicle does not output the image of the surrounding region in real time during the parking, the second image controller 140 may be turned off.

When the second image controller 140 is turned off in the case in which the vehicle does not output the image of the surrounding region in real time during the parking, power consumed to process the image may be minimized. As an example, when the vehicle is traveling or when the vehicle is outputting the image of the surrounding region in real time during the parking, the second image controller 140 may be configured to request the first image controller 130 to reset the camera device 120 in response to determining that an abnormality has occurred in the camera device 120.

As an example, the second image controller 140 may be configured to determine whether the abnormality has occurred in the camera device 120 in the process of performing the image processing through the second ISP or performing communication for image information. As an example, in response to determining that the abnormality has occurred in the camera device 120, the second image controller 140 may be configured to request the first image controller 130 to reset the power supplied to the camera device 120, and the first image controller 130 requested to reset the power may be configured to reset the power supplied to the camera device 120.

As an example, the second image controller 140 may be configured to transmit the high signal and the low signal to the first image controller 130 through the hard wire, or transmit a reset request signal to the first image controller 130 via the CAN communication to request the reset of the camera device. Exemplarily, the second image controller 140 may be configured to transmit the low signal, the high signal, and the low signal to the first image controller 130 to request the first image controller 130 to reset the camera device 120. The first image controller 130 may be configured to reset the power of the camera device 120 when receiving the reset request.

Figure 2:
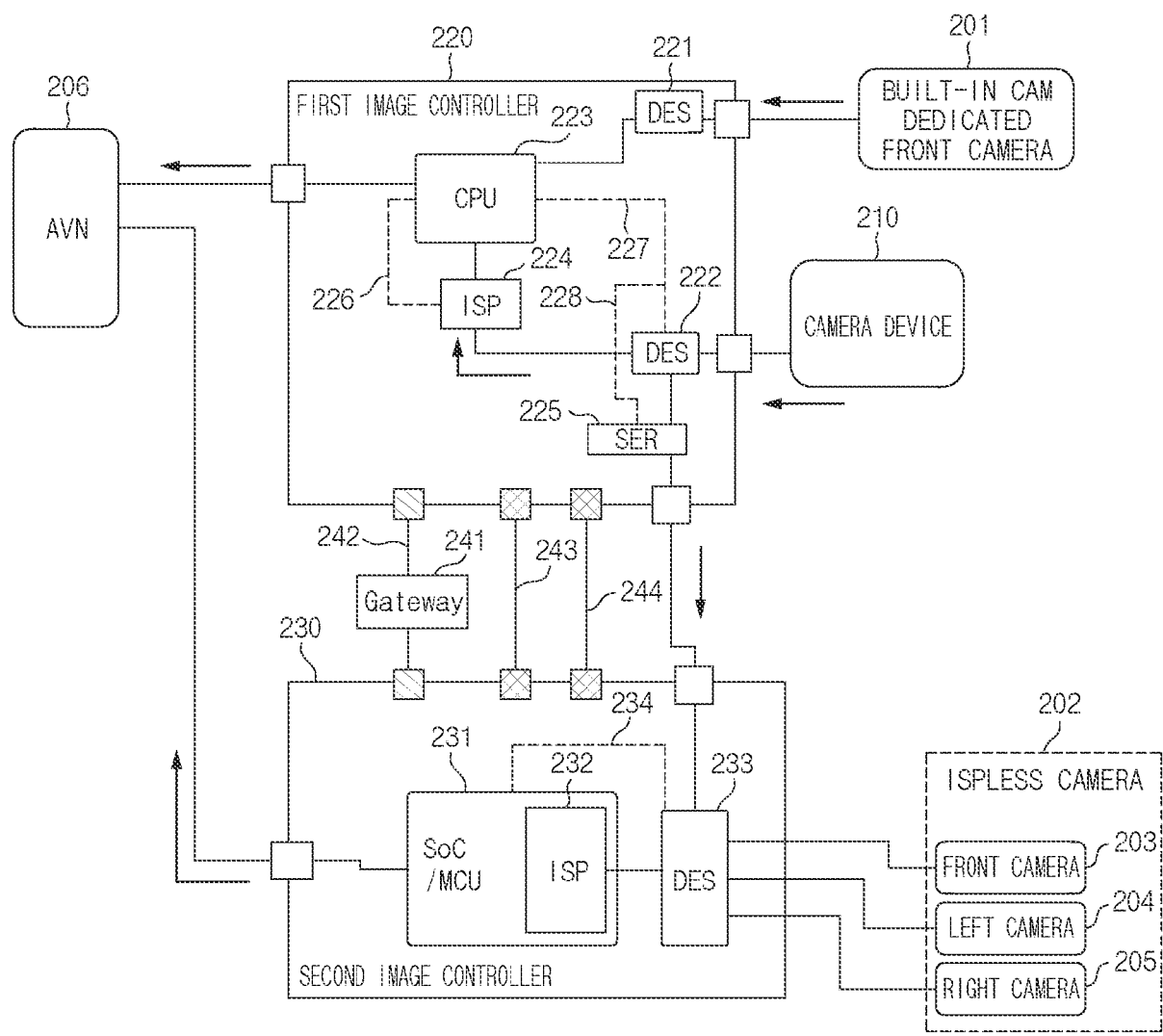
FIG. 2 is a view showing a specific configuration of a vehicle image control device according to an embodiment of the present disclosure.

FIG. 2 is a view showing a specific configuration of a vehicle image control device according to an embodiment of the present disclosure. Referring to FIG. 2, a built-in cam dedicated front camera 201 may be configured to obtain the image of the region in front of the vehicle, and transmit the obtained image to a DES 221 of a first image controller 220.

A camera device 210 may not have the built-in ISP, but may be configured to obtain the image of the surrounding region of the vehicle, and transmit the obtained image to a DES 222 of the first image controller 220. As an example, the camera device 210 may be configured to obtain the image of the region at the rear of the vehicle, and transmit the obtained image of the region at the rear of the vehicle to the DES 222 of the first image controller 220.

The first image controller 220 may include the DES 221 connected to the built-in cam dedicated front camera 201, the DES 222 connected to the camera device 210, a CPU (central processing unit) 223, an ISP 224, and a SER 225. As an example, the first image controller 220 may be configured to record the images of the front/rear camera of the vehicle during the travel or the parking based on setting of the user, and store the recorded images in the non-volatile memory in a form of a moving image file.

As an example, the first image controller 220 may be configured to supply power to the camera device 210, and share the image of the surrounding region of the vehicle obtained through the camera device 210 with a second image controller 230. As an example, the first image controller 220 may use the image of the region in front of the vehicle obtained through the built-in cam dedicated front camera 201 for exclusive use without sharing the image with the second image controller 230.

The DESs 221 and 222 may be configured to convert a camera image signal input from the outside of the control device into a signal that is able to be input into the control device. As an example, the DESs 221 and 222 may be configured to receive signals for the images obtained through the built-in cam dedicated front camera 201 and the camera device 210, respectively, and convert the received signals into the signals that are able to be input into the control device.

The CPU 223 may be configured to perform overall control of the first image controller 220. As an example, the CPU 223 may be integrated with a microcontroller unit (MCU) of the vehicle or implemented in a form of a system on chip (SoC) to perform the overall control of the first image controller 220. As an example, the CPU 223 may be configured to operate the ISP 224 and set an ISP parameter through inter-integrated circuit (I2C) communication 226. The ISP 224 may be configured to perform image processing for the images respectively obtained through the built-in cam dedicated front camera 201 and the camera device 210. As an example, the CPU 223 may be configured to perform the image processing on the images respectively obtained through the built-in cam dedicated front camera 201 and the camera device 210, and transmit the images subjected to the image processing to an AVN 206 of the vehicle. As an example, the CPU 223 may be configured to perform communication 227 with the DES 222 to initialize the DES 222 and the SER 225.

A communication circuit for the communication 227 for connecting the CPU 223 and the DES 222 to each other may be connected to a communication circuit for communication 228 for connecting the DES 222 and the SER 225 to each other, so that the CPU 223 may be configured to initialize the DES 222 and the SER 225 through the communication 227 and 228. As an example, the DES 222 and the SER 225 in the first image controller 220 may be connected to each other via the communication 228, so that information on the image obtained by the camera device 210 and transmitted to the DES 222 may be transmitted to the SER 225 through the communication 228.

The SER 225 may be configured to convert the camera image signal into a signal for transmission to the outside of the control device. As an example, the SER 225 may be configured to convert a signal for the image of the surrounding region of the vehicle received through the DES 222, and transmit the converted signal to a DES 233 of the second image controller 230. As an example, internal communication 226, 227, 228, and 234 disclosed in the present disclosure may be implemented through universal asynchronous receiver/transmitter (UART), serial peripheral interface (SPI) communication, or the like in addition to the I2C communication.

The second image controller 230 may include a SoC/MCU 231, an ISP 232, and the DES 233 connected to an ISPLess camera 202. The SoC/MCU 231 may be configured to perform overall control of the second image controller 230. The ISP 232 may be built in the SoC/MCU 231, or may exist separately, be connected to the SoC/MCU 231, and be operated by the SoC/MCU 231. The ISP 232 may be configured to perform image processing on images respectively obtained through the camera device 210 and the ISPLess camera 202.

The DES 233 may be configured to receive an image of the region in front of the vehicle, an image of the region on the left side of the vehicle, and an image of the region on the right side of the vehicle obtained through the ISPLess camera 202 including a front camera 203, a left camera 204, and a right camera 205. The front camera 203, the left camera 204, and the right camera 205 included in the ISPLess camera 202 may not have the built-in ISP. The DES 233 may be configured to receive the image of the region at the rear of the vehicle obtained through the camera device 210 from the SER 225 of the first image controller 220. As an example, the DES 233 may include one or more DESs, each of which corresponds to each camera The DES 233 may be configured to convert a signal for the received image into a signal that is able to be input into the control device. The DES 233 may be configured to convert the signal for the received image into the signal that is able to be input into the control device and transmit the converted signal to the SoC/MCU 231 through the communication 234. The SoC/MCU 231 may be configured to perform image processing on the images of the surrounding region of the vehicle obtained through the camera device 210, the front camera 203, the left camera 204, and the right camera 205 that are subjected to the image processing through the ISP 232, and transmit the images to the AVN 206 of the vehicle.

A gateway 241 may serve as a gateway when the first image controller 220 and the second image controller 230 may be connected to each other via heterogeneous vehicle communication. The first image controller 220 may be configured to transmit and receive data or commands to and from the second image controller 230 through communication 242 via the gateway 241. As an example, the first image controller 220 may be configured to receive an ISP-related parameter from the second image controller 230 through the communication 242 via the gateway 241. As an example, the controller 220 may be configured to transmit and receive a control right and a reset request for the camera device 210 to and from the second image controller 230 through the communication 242 via the gateway 241. As an example, the first image controller 220 may be configured to perform communication with the second image controller 230 through hard wires 243 and 244.

The hard wires 243 and 244 are not essential components for implementing the present disclosure, and are able to be used additionally when communication required in a process of implementing the present disclosure through vehicle communication that does not include the hard wire is performed, and there is a decrease in a system boot time or a performance. As an example, the first image controller 220 may be configured to transmit information on a master authority of internal communication for the camera device 210 to the second image controller 230 through the hard wire 243 to prevent a conflict in the communication between the first image controller 220 and the second image controller 230.

As an example, when the first image controller 220 transmits the low signal (e.g., 0 V) to the second image controller 230 through the hard wire 243, it may indicate that the first image controller 220 has the master authority of the internal communication for the camera device 210. In addition, when the first image controller 220 transmits the high signal (e.g.., 12 V) to the second image controller 230 via the hard wire 243, it may indicate that the second image controller 230 has the master authority of the internal communication for the camera device 210.

As an example, in response to determining that an abnormality has occurred in the camera device 210, the second image controller 230 may be configured to transmit the reset request to the first image controller 220 via the hard wire 244. As an example, in response to determining that the abnormality has occurred in the camera device 210, the second image controller 230 may be configured to transmit the reset request through the signals in the order of the low signal, the high signal, and the low signal through the hard wire 244.

Figure 3:
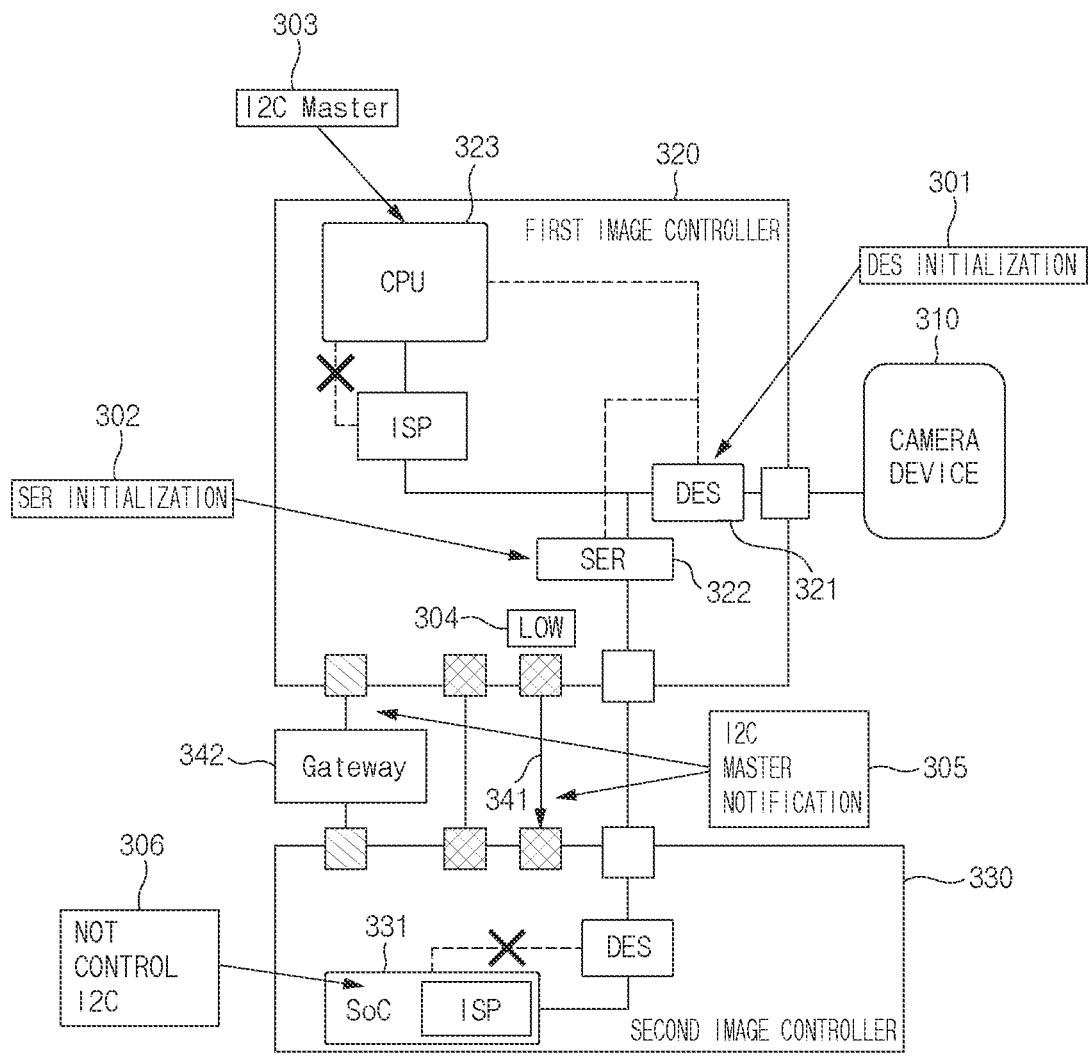
FIG. 3 is a view showing a case in which a vehicle image control device initializes a DES and a SER, according to an embodiment of the present disclosure.

FIG. 3 is a view showing a case in which a vehicle image control device initializes a DES and a SER, according to an embodiment of the present disclosure. Referring to FIG. 3, when the vehicle is traveling, a first image controller 320 may be configured to initialize a DES 321 and a SER 322 before transferring a control right for a camera device 310 to a second image controller 330 (301 and 302).

Since the second image controller 330 is not able to operate the camera device 310 while the first image controller 320 initializes the DES 321 and the SER 322, the first image controller 320 may be configured to operate the camera device 310. While the first image controller 320 initializes the DES 321 and the SER 322, a CPU 323 of the first image controller 320 may have a master authority of the I2C communication (303). The first image controller 320 may be configured to transmit the low signal to the second image controller 330 via a hard wire 341 during the initialization of the DES 321 and the SER 322 (304).

In this connection, the transmission of the low signal may indicate that the first image controller 320 has the master authority of the I2C communication and the control right for the camera device 310. While initializing the DES 321 and the SER 322, the first image controller 320 may be configured to transmit the low signal via the hard wire 341, or inform the second image controller 330, through communication via a gateway 342, of the fact that the first image controller 320 has the master authority of the I2C communication and the control right for the camera device 310 (305). A SoC 331 of the second image controller 330 may not control the I2C communication and the camera device 310 until the initialization of the DES 321 and the SER 322 is completed (306).

Figure 4:
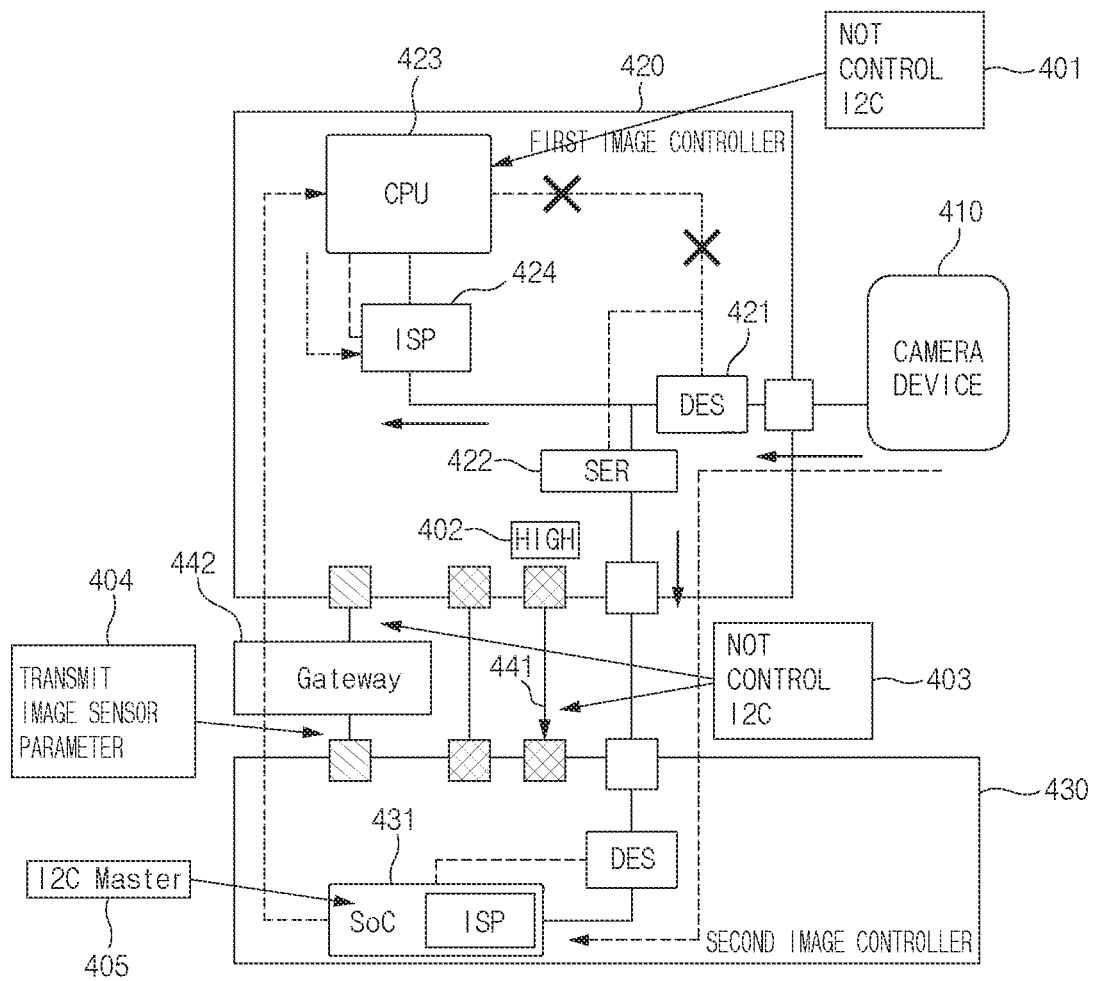
FIG. 4 is a view showing a case in which a vehicle is traveling after a vehicle image control device initializes a DES and a SER.

FIG. 4 is a view showing a case in which a vehicle is traveling after a vehicle image control device initializes a DES and a SER Referring to FIG. 4, when the vehicle is traveling, and when initialization of a DES 421 and a SER 422 is completed, a CPU 423 of a first image controller 420 may not control the I2C communication and a camera device 410 (401).

The first image controller 420 may be configured to transmit the high signal to a second image controller 430 through a hard wire 441 when the initialization of the DES 421 and the SER 422 is completed (402). In this connection, the transmission of the high signal may indicate that the second image controller 430 has the master authority of the I2C communication and a control right for the camera device 410. When the initialization of the DES 421 and the SER 422 is completed, the first image controller 420 may be configured to transmit the high signal through the hard wire 441, or inform the second image controller 430, through communication via a gateway 442, of a fact that the first image controller 420 does not have the master authority of the I2C communication and the control right for the camera device 410 (403).

When the initialization of the DES 421 and the SER 422 is completed, the second image controller 430 may be configured to transmit the image sensor parameter to the first image controller 420 through the communication via the gateway 442 or the vehicle communication (404). As an example, a SoC 431 may be configured to receive the image sensor parameter from the camera device 410 and transmit the image sensor parameter to the CPU 423. As an example, the CPU 423 may be configured to perform the image processing through an ISP 424 based on the received image sensor parameter. When the initialization of the DES 421 and the SER 422 is completed, the SoC 431 of the second image controller 430 may have the master authority for the I2C communication and the control right for the camera device 410 (405).

Figure 5:
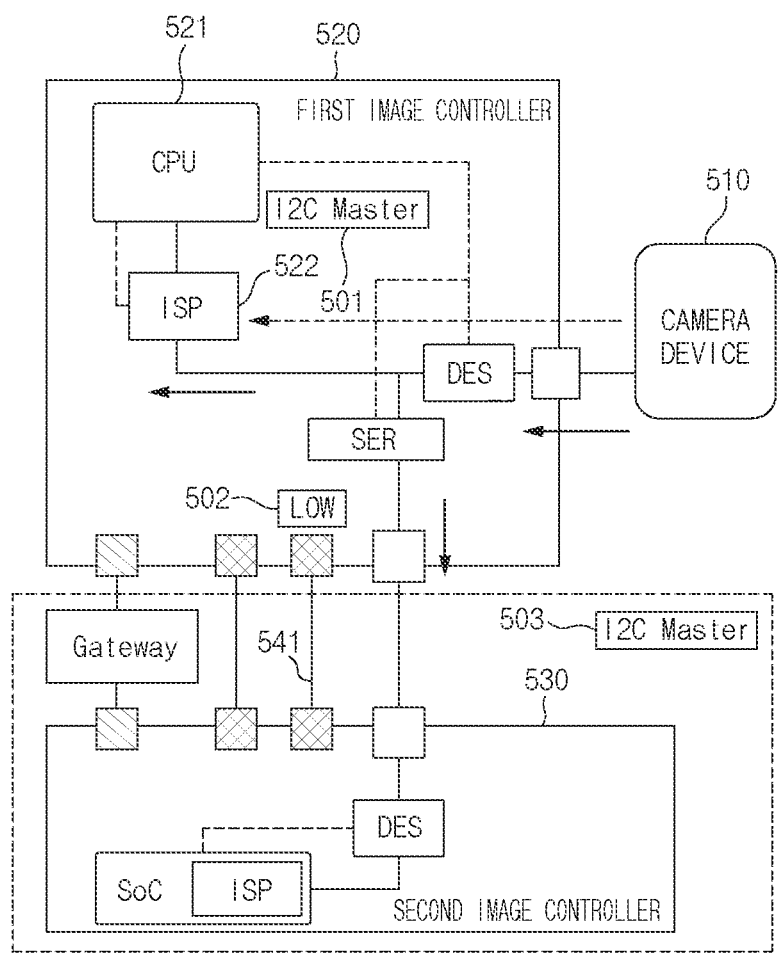
FIG. 5 is a view showing a case in which a vehicle image control device does not output an image of a surrounding region of a vehicle in real time during parking, according to an embodiment of the present disclosure.

FIG. 5 is a view showing a case in which a vehicle image control device does not output an image of a surrounding region of a vehicle in real time during parking, according to an embodiment of the present disclosure. Referring to FIG. 5, when the image of the surrounding region of the vehicle is not output in real time during the parking of the vehicle, a CPU 521 of a first image controller 520 may have the master authority for the I2C communication and a control right for a camera device 510 (501).

When the image of the surrounding region of the vehicle is not output in real time during the parking of the vehicle, the first image controller 520 may be configured to transmit the low signal to a second image controller 530 through a hard wire 541 (502). In this connection, the transmission of the low signal may indicate that the first image controller 520 has the master authority of the I2C communication and the control right for the camera device 510.

When the image of the surrounding region of the vehicle is not output in real time during the parking of the vehicle, the second image controller 530 may be turned off (503). When the image of the surrounding region of the vehicle is not output in real time during the parking of the vehicle, the second image controller 530 may be turned off, to reduce power consumed in the vehicle. When the image of the surrounding region of the vehicle is not output in real time during the parking of the vehicle, the ISP 522 may be configured to receive the image sensor parameter from the camera device 510 and perform the image processing based on the received image sensor parameter.

Figure 6:
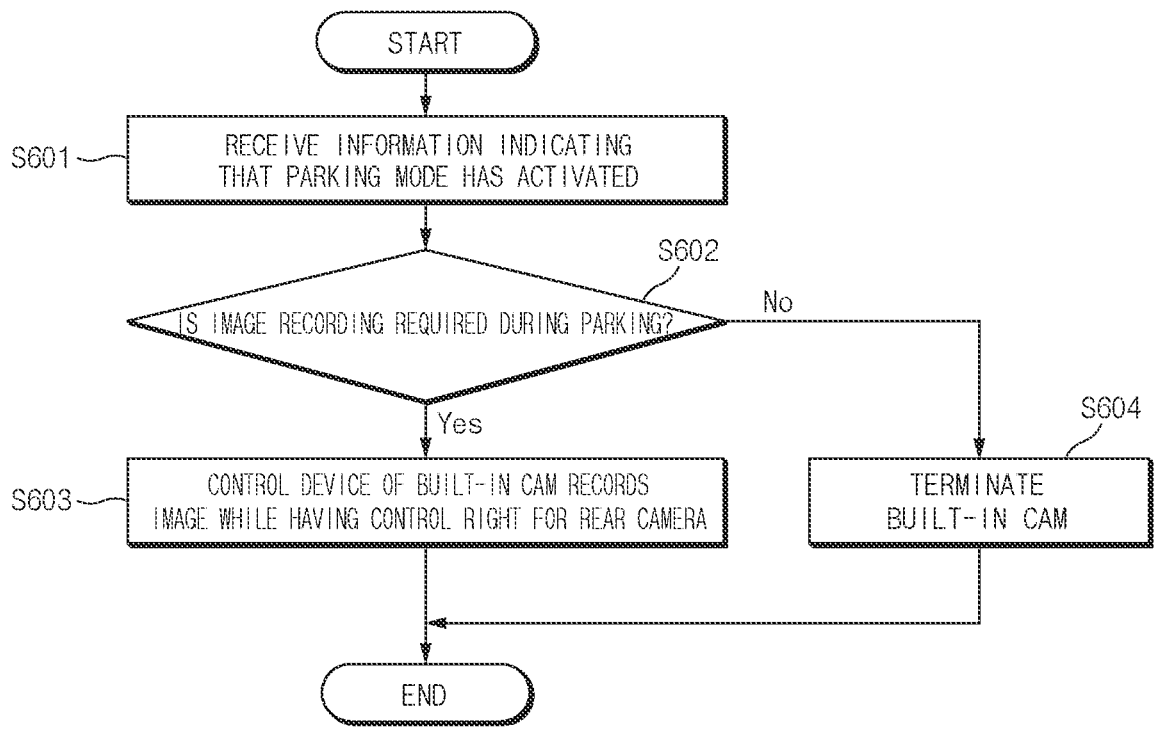
FIG. 6 is a flowchart illustrating an operation in a case in which a vehicle image control device does not output an image of a surrounding region of a vehicle in real time during parking, according to an embodiment of the present disclosure.

FIG. 6 is a flowchart illustrating an operation in a case in which a vehicle image control device does not output an image of a surrounding region of a vehicle in real time during parking, according to an embodiment of the present disclosure. Referring to FIG. 6, the vehicle image control device 100 may be configured to receive information indicating that a parking mode has activated (S601).

As an example, the vehicle image control device 100 may be configured to receive the information indicating that the parking mode has activated from the vehicle system through the communication device 110. After receiving the information indicating that the parking mode has activated (S601), the vehicle image control device 100 may be configured to determine whether the image recording is required during the parking (S602). As an example, the vehicle image control device 100 may be configured to determine whether the image recording is required during the parking based on setting of the user.

After the vehicle image control device 100 determines whether the image recording is required during the parking (S602), in response to determining that the image recording is required during the parking, the control device of the built-in cam may be configured to record the image of the region at the rear of the vehicle while having a control right for the rear camera (S603). As an example, in response to determining that the image recording is required during the parking, the control device of the built-in cam included in the first image controller 130 may be configured to record the image of the region at the rear of the vehicle through the rear camera while having the control right for the rear camera included in the camera device 120.

In particular, the control device of the built-in cam included in the first image controller 130 may be configured to transmit the low signal through the hard wire to the control device of the SVM included in the second image controller 140 to inform that the control device of the built-in cam has the master authority of the I2C communication and the control right for the rear camera After the vehicle image control device 100 determines whether the image recording is required during the parking (S602), in response to determining that the image recording is not required during the parking, the control device of the built-in cam may be terminated (S604).

Figure 7:
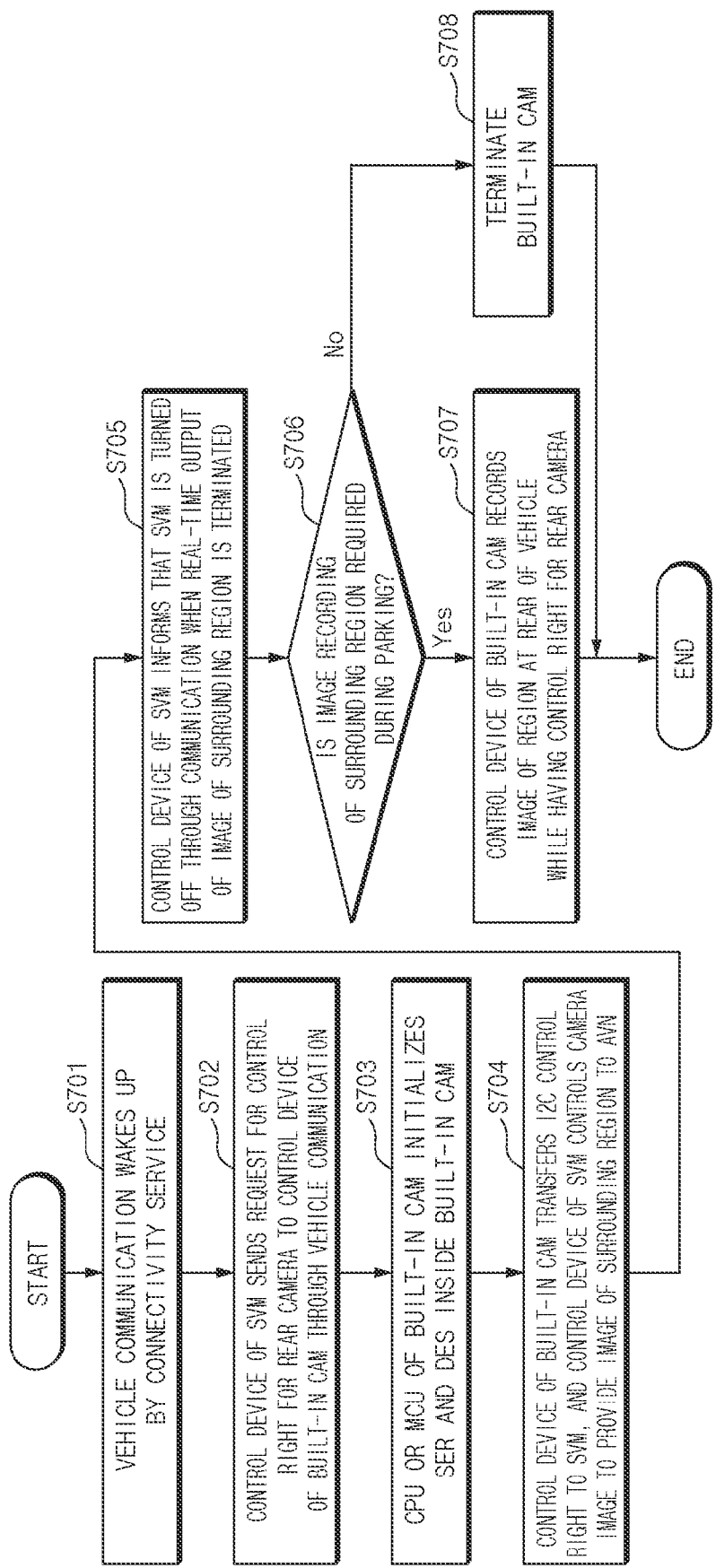
FIG. 7 is a flowchart illustrating an operation in a case in which a vehicle image control device outputs an image of a surrounding region of a vehicle in real time during parking, according to an embodiment of the present disclosure.

FIG. 7 is a flowchart illustrating an operation in a case in which a vehicle image control device outputs an image of a surrounding region of a vehicle in real time during parking, according to an embodiment of the present disclosure. Referring to FIG. 7, the vehicle communication may wake up by a connectivity service (S701). The connectivity service may mean a service provided by connecting different types of devices to each other. As an example, the connectivity service may include a service that provides a communication function by connecting a communication terminal of the user and the vehicle to each other.

After the vehicle communication wakes up by the connectivity service (S701), the control device of the SVM may be configured to transmit a request for the control right for the rear camera to the control device of the built-in cam through the vehicle communication (S702). As an example, the control device of the SVM may request the control right for the rear camera to the control device of the built-in cam via the hard wire, the gateway, or other in-vehicle communication.

After the control device of the SVM sends the request for the control right for the rear camera to the control device of the built-in cam through the vehicle communication (S702), the CPU or the MCU of the built-in cam may be configured to initialize the SER and the DES inside the built-in cam (S703). After the CPU or the MCU of the built-in cam initializes the SER and the DES inside the built-in cam (S703), the control device of the built-in cam may be configured to transfer the I2C control right to the SVM, and the control device of the SVM may be configured to control the camera image to provide the image of the surrounding region to the AVN (S704).

After the control device of the built-in cam transfers the I2C control right to the SVM, and the control device of the SVM controls the camera image to provide the image of the surrounding region to the AVN (S704), when the real-time output of the image of the surrounding region is terminated, the control device of the SVM may be configured to inform or provide a notification that the SVM is turned off through the communication (S705). As an example, the control device of the SVM may inform the control device of the built-in cam, through the hard wire, the gateway, or other in-vehicle communication, that the SVM is turned off After the control device of the SVM informs that the SVM is turned off through the communication (S705), the vehicle image control device 100 may be configured to determine whether the image recording is required during the parking (S706). After the vehicle image control device 100 determines whether the image recording is required during the parking (S706), in response to determining that the image recording is required during the parking, the control device of the built-in cam may be configured to record the image of the region at the rear of the vehicle while having the control right for the rear camera (S707). After the vehicle image control device 100 determines whether the image recording is required during the parking (S706), in response to determining that the image recording is not required during the parking, the control device of the built-in cam may be terminated (S708).

The processes of S706 to S708 are the same as the processes of S602 to S604 in FIG. 6, so that a detailed description thereof will be omitted.

Figure 8:
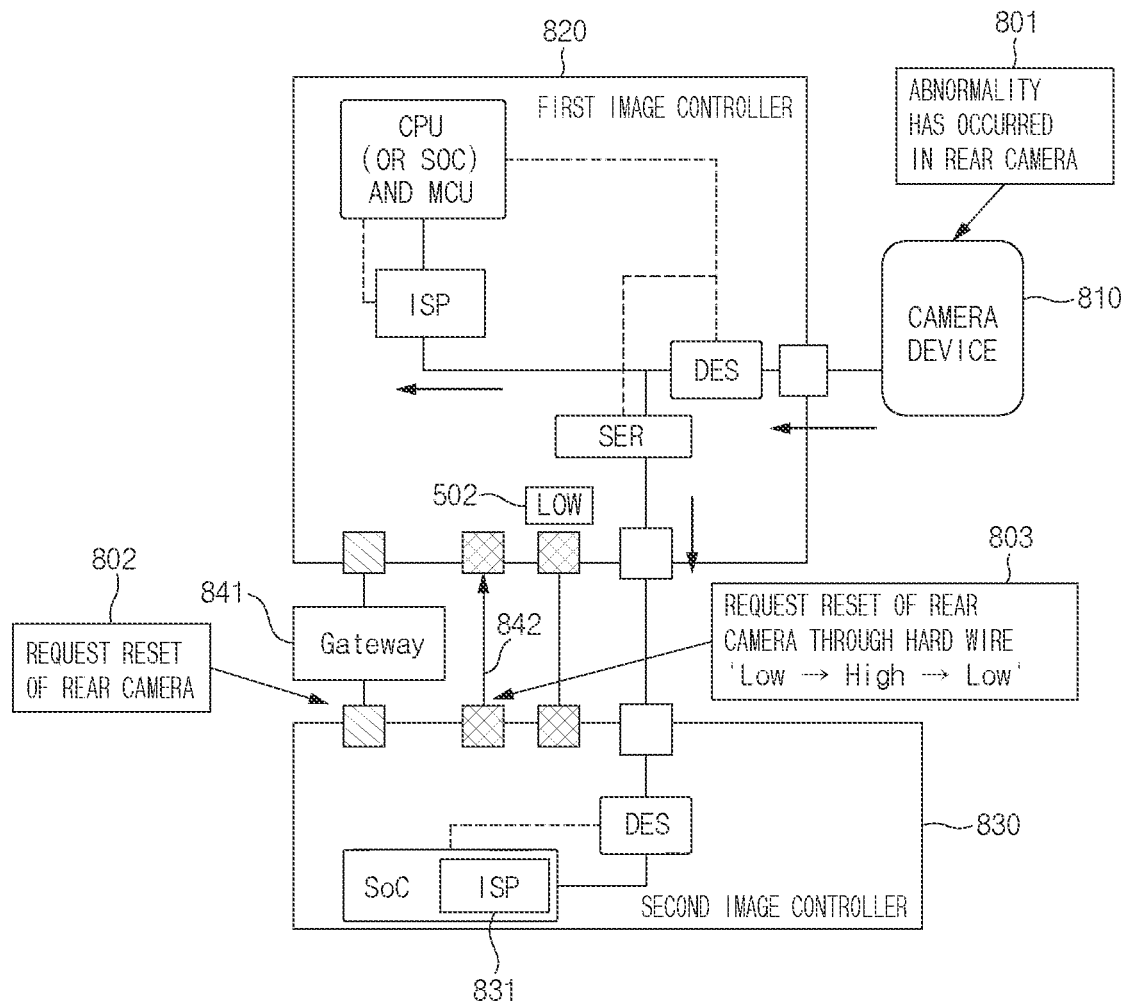
FIG. 8 is a view showing a case in which an abnormality has occurred in a camera according to an embodiment of the present disclosure.

FIG. 8 is a view showing a case in which an abnormality has occurred in a camera according to an embodiment of the present disclosure. Referring to FIG. 8, it may be assumed that an abnormality has occurred in a rear camera of a camera device 810. In particular, an image of the surrounding region of the vehicle obtained through the camera device 810 may be transmitted to an ISP 831 of a second image controller 830.

The ISP 831 may be configured to determine whether the abnormality has occurred in the rear camera through the transmitted image of the surrounding region of the vehicle. When the ISP 831 identifies the fact that the abnormality has occurred in the rear camera through the transmitted image of the surrounding region of the vehicle, the second image controller 830 may be configured to transmit a reset request for the rear camera to a first image controller 820 via communication of a gateway 841 (802).

In addition, when the ISP 831 identifies the fact that the abnormality has occurred in the rear camera through the transmitted image of the surrounding region of the vehicle, the second image controller 830 may be configured to transmit the low signal, the high signal, and the low signal for the first image controller 820 through a hard wire 842 to request the first image controller 820 to reset the rear camera (830). The first image controller 820 may be configured to reset power of the rear camera when receiving the reset request from the second image controller 830.

Figure 9:
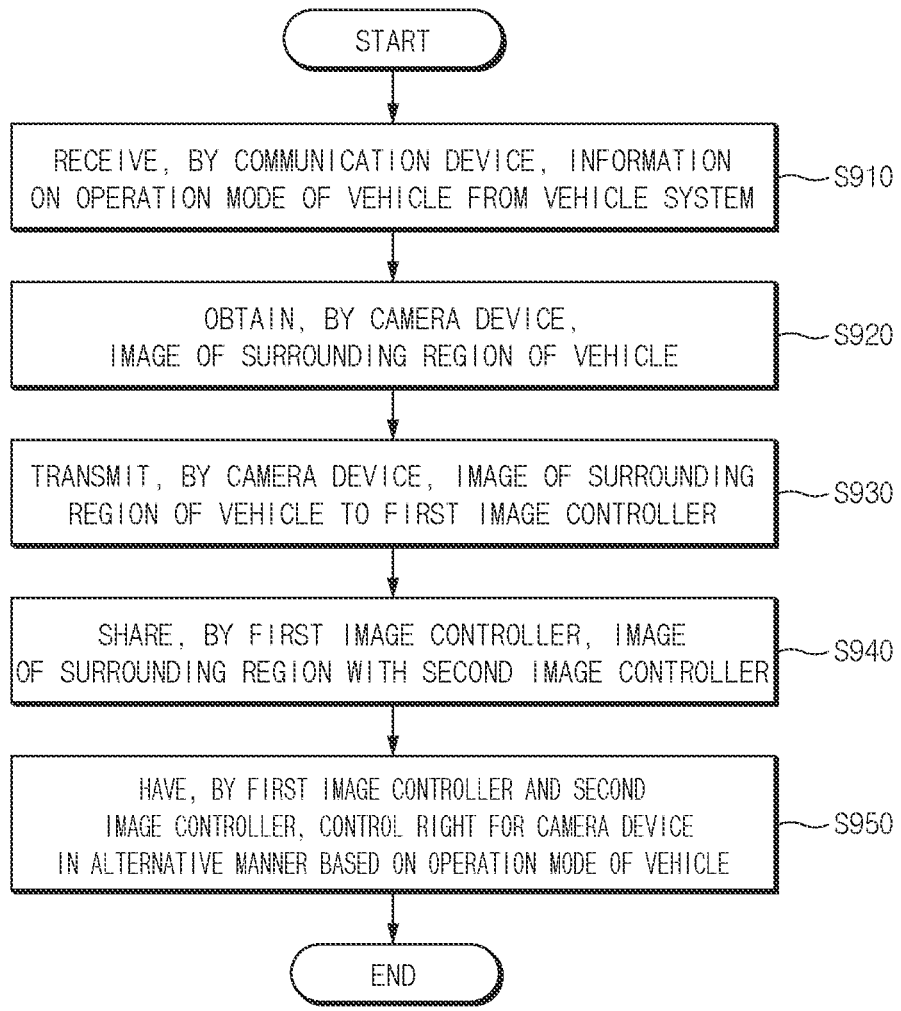
FIG. 9 is a flowchart illustrating a vehicle image control method according to an embodiment of the present disclosure.

FIG. 9 is a flowchart illustrating a vehicle image control method according to an embodiment of the present disclosure. Referring to FIG. 9, a vehicle image control method may include receiving, by the communication device 110, the information on the operation mode of the vehicle from the vehicle system (S910), obtaining, by the camera device 120, the image of the surrounding region of the vehicle (S920), transmitting, by the camera device 120, the image of the surrounding region of the vehicle to the first image controller 130 (S930), sharing, by the first image controller 130, the image of the surrounding region with the second image controller 140 (S940), and having, by the first image controller 130 and the second image controller 140, the control right for the camera device 120 in the alternative manner based on the operation mode of the vehicle (S950).

The receiving, by the communication device 110, of the information on the operation mode of the vehicle from the vehicle system (S910) may be performed using the in-vehicle communication such as the CAN communication, the LIN communication, the Flex-Ray, the MOST, the Ethernet, the CAN-FD, or the like. The information on the operation mode of the vehicle may include information on whether the vehicle is traveling, whether the vehicle is outputting the image of the surrounding region of the vehicle in real time during the parking, and whether the vehicle is not outputting the image of the surrounding region of the vehicle in real time during the parking.

The obtaining, by the camera device 120, of the image of the surrounding region of the vehicle (S920) may be performed through the camera that does not have the built-in ISP. The transmitting, by the camera device 120, of the image of the surrounding region of the vehicle to the first image controller 130 (S930) may be performed through the vehicle communication such as the I2C and the like.

The sharing, by the first image controller 130, of the image of the surrounding region with the second image controller 140 (S940) may be performed through the vehicle communication such as the I2C and the like. In particular, operation of S950 may be performed in a different order according to an embodiment and may be performed simultaneously with other operations regardless of the order even when the order is different from that in the illustrated flowchart.

As an example, the having, by the first image controller 130 and the second image controller 140, of the control right for the camera device 120 in the alternative manner based on the operation mode of the vehicle (S950) may include having, by the second image controller 140, the control right for the camera device 120 when the vehicle is traveling or when the vehicle is outputting the image of the surrounding region in real time during the parking.

As an example, the having, by the first image controller 130 and the second image controller 140, of the control right for the camera device 120 in the alternative manner based on the operation mode of the vehicle (S950) may include having, by the first image controller 130, the control right for the camera device 120 when the vehicle is not outputting the image of the surrounding region in real time during the parking.

As an example, the having, by the first image controller 130 and the second image controller 140, of the control right for the camera device 120 in the alternative manner based on the operation mode of the vehicle (S950) may include having the control right for the camera device 120 until the initialization of the DES and the SER is completed when the vehicle is traveling or when the vehicle is outputting the image of the surrounding region in real time during the parking.

Although not shown, the vehicle image control method may further include sharing, by the first image controller 130 and the second image controller 140, the image sensor parameter of the camera device 120 with each other.

As an example, the vehicle image control method may further include performing, by the first image controller 130, the initialization of the DES that converts the image of the surrounding region into the internal signal and the initialization of the SER that converts the internal signal into the image signal for the external transmission when the vehicle is traveling or when the vehicle is outputting the image of the surrounding region in real time during the parking.

As an example, the vehicle image control method may further include turning off the second image controller 140 when the vehicle does not output the image of the surrounding region in real time during the parking. As an example, the vehicle image control method may further include requesting, by the second image controller 140, the first image controller 130 to reset the camera device 120 when it is determined that the abnormality has occurred in the camera device 120 while the vehicle is traveling or while the vehicle is outputting the image of the surrounding region in real time during the parking.

According to the present disclosure, the system that may share the images obtained through one or two or more cameras that do not have the built-in ISP may be implemented through the plurality of control devices. Accordingly, the images obtained through the camera may be used by the plurality of control devices, thereby improving an efficiency of the in-vehicle communication. In particular, according to the present disclosure, an effect of minimizing power consumption may be provided by switching the image control of the one or more cameras without the built-in ISP between the plurality of control devices.

The operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal. The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the image of the vehicle according to the present disclosure are as follows.

According to at least one of the embodiments of the present disclosure, the device and the method for controlling the image of the vehicle for the image of the vehicle camera that does not have the built-in image signal processor (ISP) may be provided.

In addition, according to at least one of the embodiments of the present disclosure, the device and the method for controlling the image of the vehicle that allow the technology for transferring the ISP, which was built in the camera, to the control device to operate appropriately based on each vehicle operation mode may be provided.

In addition, according to at least one of the embodiments of the present disclosure, the device and the method for controlling the image of the vehicle that do not allow the inoperability or the image quality degradation to occur by setting the operation priority for controlling the camera that does not have the built-in ISP may be provided.

In addition, according to at least one of the embodiments of the present disclosure, the device and the method for controlling the image of the vehicle that minimize the consumption of the current for the plurality of control devices that control the images of the camera that does not have the built-in ISP may be provided.

In addition, according to at least one of the embodiments of the present disclosure, the device and the method for controlling the image of the vehicle that support the fail-safe function during the abnormal operation of the camera that does not have the built-in ISP may be provided.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling an image of a vehicle, the device comprising:
    a communication device disposed in the vehicle for receiving information on an operation mode of the vehicle from a vehicle system;
    a camera device disposed in the vehicle, and not having a built-in image signal processor (ISP), wherein the camera device is configured to obtain an image of a surrounding region of the vehicle, and transmits the image of the surrounding region to a first image controller;
    the first image controller having a first ISP for performing image processing, wherein the first image controller is configured to share the image of the surrounding region with a second image controller; and
    the second image controller having a second ISP for performing image processing,
    wherein the first image controller and the second image controller alternatively have a control right for the camera device depending on the operation mode of the vehicle.

2. The device of claim 1, wherein the first image controller is configured to:
    perform image processing for the image of the surrounding region through the first ISP; and
    store the image-processed image of the surrounding region in a non-volatile memory.

3. The device of claim 1, wherein the second image controller is configured to:
    perform image processing for the image of the surrounding region through the second ISP; and
    output the image-processed image of the surrounding region in real time.

4. The device of claim 1, wherein the camera device includes a camera configured to obtain an image of a region at the rear of the vehicle.

5. The device of claim 1, wherein the first image controller and the second image controller are configured to share an image sensor parameter of the camera device with each other.

6. The device of claim 1, wherein the operation mode of the vehicle includes a traveling mode, a mode of outputting the image of the surrounding region of the vehicle in real time during parking, and a mode of not outputting the image of the surrounding region of the vehicle in real time during the parking.

7. The device of claim 1, wherein the first image controller includes:
    a deserializer (DES) configured to convert the image of the surrounding region transmitted from the camera device into an internal signal; and
    a serializer (SER) configured to convert the internal signal into an image signal for external transmission,
    wherein the first image controller is configured to initialize the DES and the SER when the vehicle is traveling or when the vehicle outputs the image of the surrounding region in real time during parking.

8. The device of claim 7, wherein the first image controller has the control right for the camera device until the initialization of the DES and the SER is completed.

9. The device of claim 1, wherein the second image controller has the control right for the camera device when the vehicle is traveling or when the vehicle outputs the image of the surrounding region in real time during parking.

10. The device of claim 1, wherein the second image controller is turned off when the vehicle does not output the image of the surrounding region in real time during parking.

11. The device of claim 1, wherein the first image controller has the control right for the camera device when the vehicle does not output the image of the surrounding region in real time during parking.

12. The device of claim 1, wherein the second image controller is configured to request the first image controller to reset the camera device in response to determining that an abnormality has occurred in the camera device when the vehicle is traveling or when the vehicle outputs the image of the surrounding region in real time during parking.

13. The device of claim 1, wherein the first image controller is configured to transmit a high signal or a low signal to the second image controller through at least one of a hard wire and/or a controller area network (CAN) to transmit information on the control right for the camera device.

14. The device of claim 12, wherein the second image controller is configured to request the reset of the camera device by transmitting a high signal or a low signal to the first image controller through a hard wire or transmitting a reset request signal to the first image controller via a controller area network (CAN) communication.

15. A method for controlling an image of a vehicle, the method comprising:
    receiving, by a communication device disposed within the vehicle, information on an operation mode of the vehicle from a vehicle system;
    obtaining, by a camera device disposed within the vehicle, and not having a built-in ISP, an image of a surrounding region of the vehicle;
    transmitting, by the camera device, the image of the surrounding region to a first image controller;

sharing, by the first image controller having a first ISP for performing image processing, the image of the surrounding region with a second image controller having a second ISP for performing image processing; and alternatively having, by the first image controller and the second image controller, a control right for the camera device depending on the operation mode of the vehicle.

16. The method of claim 15, further comprising:

sharing, by the first image controller and the second image controller, an image sensor parameter of the camera device with each other.

17. The method of claim 15, further comprising:

initializing, by the first image controller, a deserializer (DES) configured to convert the image of the surrounding region transmitted from the camera device into an internal signal, and a serializer (SER) configured to convert the internal signal into an image signal for external transmission when the vehicle is traveling or when the vehicle outputs the image of the surrounding region in real time during parking, wherein the alternatively having, by the first image controller and the second image controller, of the control right for the camera device includes:

providing, by the first image controller, the control right for the camera device until the initialization of the DES and the SER is completed.

18. The method of claim 15, wherein the alternatively having, by the first image controller and the second image controller, of the control right for the camera device includes:

providing, by the second image controller, the control right for the camera device when the vehicle is traveling or when the vehicle outputs the image of the surrounding region in real time during parking.

19. The method of claim 15, further comprising:

turning off the second image controller when the vehicle does not output the image of the surrounding region in real time during parking, wherein the alternatively having, by the first image controller and the second image controller, of the control right for the camera device includes:

providing, by the first image controller, the control right for the camera device when the vehicle does not output the image of the surrounding region in real time during parking.

20. The method of claim 15, further comprising:

requesting, by the second image controller, the first image controller to reset the camera device when it is determined that an abnormality has occurred in the camera device when the vehicle is traveling or when the vehicle outputs the image of the surrounding region in real time during parking.

* * * * *